US012441197B2

(12) United States Patent
Kim et al.

(10) Patent No.: US 12,441,197 B2
(45) Date of Patent: Oct. 14, 2025

(54) SYSTEM FOR CONTROLLING REGENERATIVE BRAKING TORQUE OF ECO-FRIENDLY VEHICLE AND METHOD OF CONTROLLING SAME

(71) Applicants: Hyundai Motor Company, Seoul (KR); Kia Corporation, Seoul (KR)

(72) Inventors: Jin Yong Kim, Daegu (KR); Hyun Seok Jang, Daegu (KR); Chang Eun Na, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 388 days.

(21) Appl. No.: 18/078,951

(22) Filed: Dec. 10, 2022

(65) Prior Publication Data

US 2023/0398876 A1 Dec. 14, 2023

(30) Foreign Application Priority Data

May 23, 2022 (KR) ........................ 10-2022-0062549

(51) Int. Cl.
*B60L 7/18* (2006.01)

(52) U.S. Cl.
CPC ........... *B60L 7/18* (2013.01); *B60L 2240/461* (2013.01); *B60L 2240/465* (2013.01); *B60L 2240/64* (2013.01)

(58) Field of Classification Search
CPC ... B60L 7/18; B60L 2240/461; B60L 2240/64
See application file for complete search history.

(56) References Cited

U.S. PATENT DOCUMENTS

| | | | |
|---|---|---|---|
| 6,691,013 B1 | 2/2004 | Brown | |
| 9,463,782 B2 | 10/2016 | Kikawa et al. | |
| 2016/0214486 A1* | 7/2016 | Suzuki | B60L 50/52 |
| 2018/0056980 A1* | 3/2018 | Cho | B60W 20/40 |
| 2018/0237003 A1* | 8/2018 | Watanabe | B60W 10/14 |
| 2020/0156608 A1* | 5/2020 | Jeon | B60W 30/18127 |
| 2020/0376958 A1* | 12/2020 | Ono | B60K 17/22 |

FOREIGN PATENT DOCUMENTS

| | | | | |
|---|---|---|---|---|
| JP | 2006-345626 | A | | 12/2006 |
| JP | 2014-051202 | A | | 3/2014 |
| KR | 100207194 | B1 | * | 7/1999 |
| KR | 10-2017-0073923 | A | | 6/2017 |
| KR | 20170098438 | A | * | 8/2017 |
| KR | 10-1786666 | B1 | | 10/2017 |
| KR | 10-2019-0040623 | A | | 4/2019 |
| KR | 10-2019-0076358 | A | | 7/2019 |
| KR | 20200056500 | A | * | 5/2020 |

* cited by examiner

*Primary Examiner* — Justin S Lee
(74) *Attorney, Agent, or Firm* — Fox Rothschild LLP

(57) ABSTRACT

Proposed is a system and method of controlling regenerative braking torque of an eco-friendly vehicle, the system and method being configured to quickly reduce and maintain a wheel slip amount less than a reference value during coasting, and accordingly, being able to achieve coasting stability and stable regenerative braking, by controlling regenerative brake into zero when a wheel slip over a reference value is generated and an Anti-lock Brake System (ABS) is turned on while an eco-friendly vehicle coasts, and by gradually increasing regenerative braking torque of a motor with a predetermined inclination from zero using Proportional-Integral (PI) control when the ABS is turned off.

18 Claims, 6 Drawing Sheets

SYSTEM FOR CONTROLLING REGENERATIVE BRAKING TORQUE OF ECO-FRIENDLY VEHICLE AND METHOD OF CONTROLLING SAME

CROSS REFERENCE TO RELATED APPLICATION(S)

The present application claims, under 35 U.S.C. § 119 (a), the benefit of Korean Patent Application No. 10-2022-0062549, filed May 23, 2022, the disclosure of which is incorporated herein by reference in its entirety.

BACKGROUND

Technical Field

Embodiments of the present disclosure relate to a system for controlling regenerative braking torque of an echo-friendly vehicle and a method of controlling the same. In more detail, the present disclosure relates to a system and method of controlling regenerative braking torque of an echo-friendly vehicle, the system and method being configured to control regenerative braking torque at a level at which a wheel slip rate decreases during coasting of an echo-friendly vehicle so that stability in coasting and stable regenerative braking can be achieved.

Background

Echo-friendly vehicles include hybrid vehicles, which use an engine and a motor as driving sources, and electric vehicles and a fuel cell vehicles, which use a motor as a driving source.

When echo-friendly vehicles coast (i.e., when a vehicle is driven by inertia without an accelerator pedal and a brake pedal depressed), regenerative braking that operates a motor as a power generator to charge a battery by collecting inertia energy can be performed. That is, motor torque may be controlled into regenerative braking torque (referred to as coast regen torque) that is torque having a negative magnitude when such echo-friendly vehicles coast, whereby a battery can be charged through collection of inertia energy.

It is advantageous to set high regenerative braking torque in order to increase an energy collection ratio while such echo-friendly vehicles coast, but wheel slip of driving wheels may be generated instead by regenerative braking torque during coasting on a low-friction road such as a snowy road, an icy road, and a rainy road. Further, problems of deterioration of driving stability, disconnection of driving of a vehicle, etc. may be caused.

Further, the larger the wheel slip of driving wheel during coasting on a low-friction road, the lower the driving stability of a vehicle may be, including yawing, that is, inclination of a vehicle body.

When the tires of front wheels that are non-driving wheels and the tires of rear wheels that are driving wheels are different kinds of tires or when there is an air pressure difference between front wheel tires and rear wheel tires, the wheel speeds of the front wheels and the rear wheels are the same, but there may be a difference between the wheel speed of the front wheels and the wheel speed of the rear wheel that is measured by wheel sensors because a wheel speed is detected using the product of the rotation speed of a wheel and the dynamic radius of a tire (rotation speed×dynamic radius) when a wheel speed is detected through a wheel sensor. Accordingly, even though there is no actual wheel slip, a vehicle controller may misjudge that there is wheel slip due to the difference between the wheel speed of the front wheel(s) and the wheel speed of the rear wheels that are detected by wheel sensors.

Accordingly, when regenerative braking is performed during coasting on a low-friction road, wheel slip control may be performed based on wheel speeds detected by wheel sensors to secure stability of the vehicle. In this case, when wrong wheel slip is calculated by an error of wheel speed (sensor values) due to an air pressure difference and variation of the dynamic radii of different kinds of tires described above, a vehicle controller may control regenerative braking torque into 0 or may perform control of excessively using regenerative braking torque, so yawing due to slip may be generated.

Meanwhile, when eco-friendly vehicles such as an electric truck and an electric bus coast on a low-friction road and wheel slip is generated by regenerative braking torque, an Anti-lock Brake System (ABS) may be turned on to secure braking stability.

In this case, when the ABS is turned on, regenerative braking is stopped, and when the ABS is turned off, motor torque is controlled into generative braking torque having a preset magnitude, whereby regenerative braking is performed again.

For example, when an eco-friendly vehicle coasts on a low-friction road, and an ABS is turned on due to a wheel slip ratio larger than a reference level, regenerative braking torque of a motor may be controlled into zero (0), as indicated by an arrow ① in FIG. 1. However, when the wheel slip ratio drops less than the reference level and the ABS is turned off, regenerative braking torque may be controlled to rapidly increase up to a preset magnitude, as indicated by an arrow ② in FIG. 1.

As described above, when an eco-friendly vehicle coasts on a low-friction road, a wheel slip ratio due to regenerative braking torque may be repeatedly generated over and less than a reference level, as can be seen from FIG. 1. As a result, there is a problem that stability in coasting of a vehicle decreases and disconnection of driving continues.

In other words, during coasting on a low-friction road, a wheel slip ratio due to large regenerative braking torque over a reference level may be periodically generated. Further, when an ABS that has been turned on is turned off, a wheel slip amount due to regenerative braking torque having a preset magnitude not only does not quickly decrease less than the reference level, but is not maintained less than the reference level. Accordingly, there is a problem wherein stability in coasting of an eco-friendly vehicle decreases and disconnection of driving continues.

SUMMARY

The present disclosure has been made in an effort to solve the general problems of the existing technologies and an objective of the present disclosure is to provide a system and method of controlling regenerative braking torque of an echo-friendly vehicle, the system and method being able to quickly reduce and maintain a wheel slip amount less than a reference level during coasting and to achieve stability of coasting and stable regenerative braking by controlling regenerative braking torque into zero through follow-up control when a wheel slip ratio over a reference level is generated and an Anti-lock Brake System (ABS) is turned on while an eco-friendly vehicle coasts, and by gradually increasing regenerative braking torque of a motor up to target regenerative braking torque with a predetermined inclination using Proportional-Integral (PI) control.

In order to achieve the objectives, an exemplary embodiment of the present disclosure provides a system for controlling regenerative braking torque of an eco-friendly vehicle, the system may comprise: a wheel slip ratio calculator configured to calculate left and right wheel slip ratios based on a wheel speed of front wheels and a wheel speed of rear wheels; a slip control entrance determiner configured to determine whether to enter low-friction slip control based on the wheel slip ratios calculated by the wheel slip ratio calculator; a PI controller configured to determine target regenerative braking torque of a motor as a level at which a wheel slip ratio is a target wheel slip ratio to perform low-friction slip control during coasting; and a motor controller configured to control regenerative braking torque of the motor based on a target regenerative braking torque instruction value determined for low-friction slip control of the PI controller.

The system for controlling regenerative braking torque of an eco-friendly vehicle may further comprise a wheel speed compensator configured to create a wheel speed of rear wheels that is equal to a wheel speed of front wheels by calculating a ratio between a wheel speed of the front wheels and a wheel speed of the rear wheels and by multiplying the calculated ratio by the wheel speed of the rear wheels.

The slip control entrance determiner may be configured to select a larger value of a slip ratio of left wheels and a slip ratio of right wheels for determination when determining whether to enter low-friction slip control.

The system for controlling regenerative braking torque of an eco-friendly vehicle may further comprise a slip control mis-entrance determiner configured to prevent entering low-friction slip control by the PI controller when a difference between the wheel speed of front wheels and the wheel speed of rear wheels decreases, depending on shapes of driving roads.

The slip control mis-entrance determiner may be configured to prevent entering low-friction slip control when a larger value of a difference between a front left wheel speed and a rear left wheel speed and a difference between a front right wheel speed and a rear right wheel speed decreases by a predetermined level for a predetermined time.

In particular, the PI controller may be configured to determine the regenerative braking torque of the motor into zero (0) when a wheel slip ratio over a reference value is generated and an ABS is turned on, and to perform low-friction slip control of determining the target regenerative braking torque of the motor as a level at which a current wheel slip ratio decreases to a first target wheel slip ratio when a wheel slip ratio drops less than the reference value and the ABS is turned off.

The PI controller may be configured to perform PI control of increasing the regenerative braking torque of the motor up to the target regenerative braking torque with a predetermined inclination for a predetermined time when the ABS has been turned off such that a wheel slip ratio is reduced and maintained at the first wheel slip ratio.

A large difference may be generated between an actual regenerative braking torque following zero (0) with the ABS turned on and a target regenerative braking torque value for determining a level at which the current wheel slip ratio is reduced to the first wheel slip ratio by PI control with the ABS turned off. Accordingly, in order to prevent this problem and maintain continuity of control, the PI controller may be configured to reset an integral gain into an actual regenerative braking torque value at the moment when the ABS is turned off from a turned-on state.

The system for controlling regenerative braking torque of an eco-friendly vehicle may further comprise a slip control stop determiner configured to stops low-friction slip control by the PI controller when the coasting condition is removed or regenerative braking torque determined by low-friction slip control of the PI controller is maintained at less than or equal to a reference value for a predetermined time.

The system for controlling regenerative braking torque of an eco-friendly vehicle may further comprise a slip control target compensator configured to set a target wheel slip ratio into a second target wheel slip ratio lower than a first target wheel slip ratio and to give an instruction to the PI controller when an ABS is continuously repeatedly turned on and off over a predetermined number of times within a predetermined time during low-friction slip control by the PI controller.

In order to achieve the objectives, another embodiment of the present disclosure provides a method controlling regenerative braking torque of an eco-friendly vehicle, the method may comprise: a step of calculating left and right wheel slip ratios based on a wheel speed of front wheels and a wheel speed of rear wheels; a slip control entrance determination step of determining to enter low-friction slip control based on the calculated wheel slip ratios; a step of determining target regenerative braking torque of a motor into a level at which a wheel slip ratio is a target wheel slip ratio to perform low-friction slip control during coasting; and a step of controlling regenerative braking torque of the motor based on a target regenerative braking torque instruction value determined for the low-friction slip control.

The method of controlling regenerative braking torque of an eco-friendly vehicle may further comprise a wheel speed compensation step of creating a wheel speed of rear wheels that is the same as a wheel speed of front wheels by calculating a ratio between a wheel speed of the front wheels and a wheel speed of the rear wheels and by multiplying the calculated ratio by the wheel speed of the rear wheels.

The slip control entrance determiner may be configured to select a larger value of a slip ratio of left wheels and a slip ratio of right wheels for determination when determining whether to enter low-friction slip control.

The method of controlling regenerative braking torque of an eco-friendly vehicle may further comprise a slip control mis-entrance determination step of preventing entering the low-friction slip control when a difference between the wheel speed of front wheels and the wheel speed of rear wheels decreases, depending on the shapes of driving roads.

The slip control mis-entrance determiner may be configured to prevent entering low-friction slip control when a larger value of a difference between a front left wheel speed and a rear left wheel speed and a difference between a front right wheel speed and a rear right wheel speed decreases by a predetermined level for a predetermined time.

In particular, in the low-friction slip control, the regenerative braking torque of the motor may be determined into zero (0) when a wheel slip ratio over a reference value is generated and an ABS is turned on, and the target regenerative braking torque of the motor may be determined as a level at which a current wheel slip ratio decreases to a first target wheel slip ratio when a wheel slip ratio drops less than the reference value and the ABS is turned off.

In the low-friction slip control, when the ABS has been turned off, PI control of increasing the regenerative braking torque of the motor up to the target regenerative braking torque with a predetermined inclination for a predetermined time may be performed such that a wheel slip ratio is reduced and maintained at the first wheel slip ratio.

In the low-friction slip control, an integral gain may be reset into an actual regenerative braking torque value at the moment when the ABS is turned off from a turned-on state.

The method of controlling regenerative braking torque of an eco-friendly vehicle may further comprise a step of stopping low-friction slip control by a PI controller when the coasting condition is removed or regenerative braking torque determined by low-friction slip control of the PI controller is maintained at less than or equal to a reference value a predetermined time.

The method of controlling regenerative braking torque of an eco-friendly vehicle may further comprise a slip control target compensation step of setting a target wheel slip ratio into a second target wheel slip ratio lower than a first target wheel slip ratio and of giving an instruction to a PI controller when an ABS is continuously repeatedly turned on and off over a predetermined number of times within a predetermined time during the low-friction slip control.

The present disclosure provides the following effects through the objectives described above.

First, when a wheel slip over a reference value is generated and an ABS has been turned on while an eco-friendly vehicle coasts, it is possible to control regenerative brake to follow zero, and when the ABS is turned off, it is possible to gradually increase regenerative braking torque of a motor up to target regenerative braking torque with a predetermined inclination using PI control. Therefore, it is possible to quickly reduce and maintain a wheel slip amount less than a reference value during coasting, thereby minimizing frequent turning-on of the ABS due to a wheel slip ration over a reference value during coasting. Accordingly, it is possible to achieve coasting stability and stable regenerative braking.

Second, it is possible to secure accuracy and stability of low-friction slip control by determining a driving state in which a vehicle is being driven over a raised spot or a bump and by preventing entering low-friction slip control.

Third, regenerative braking torque of a motor is controlled to follow zero (0) when an ABS has been turned on, and an integral gain is reset into a current (actual regenerative braking torque) at the moment when the ABS is turned off from a turned-on state, whereby it is possible to secure continuity of PI control.

Fourth, when the ABS is repeatedly turned on and off over a predetermined number of times within a predetermined time during low-friction slip control, a target wheel slip ratio is set into a second target wheel slip ratio lower than a first target wheel slip ratio, whereby it is possible to further decrease regenerative braking torque, and accordingly, it is possible to secure continuity of low-friction slip control.

DETAILED DESCRIPTION

Hereinafter, exemplary embodiments of the present disclosure will be described in detail with reference to the accompanying drawings.

Figure 1:
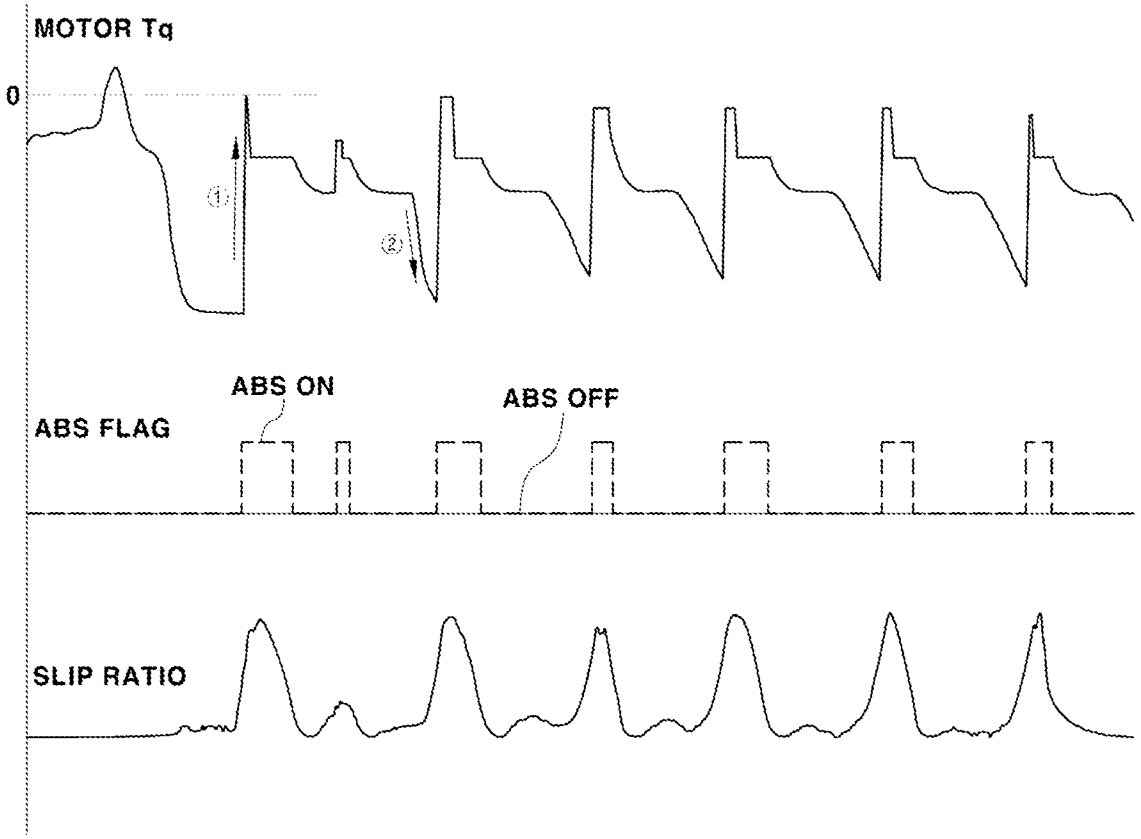
FIG. 1 is a graph showing an example of controlling a slip ratio and regenerative braking torque according to an Anti-lock Brake System (ABS) flag when an eco-friendly vehicle coasts in the related art.
Figure 2:
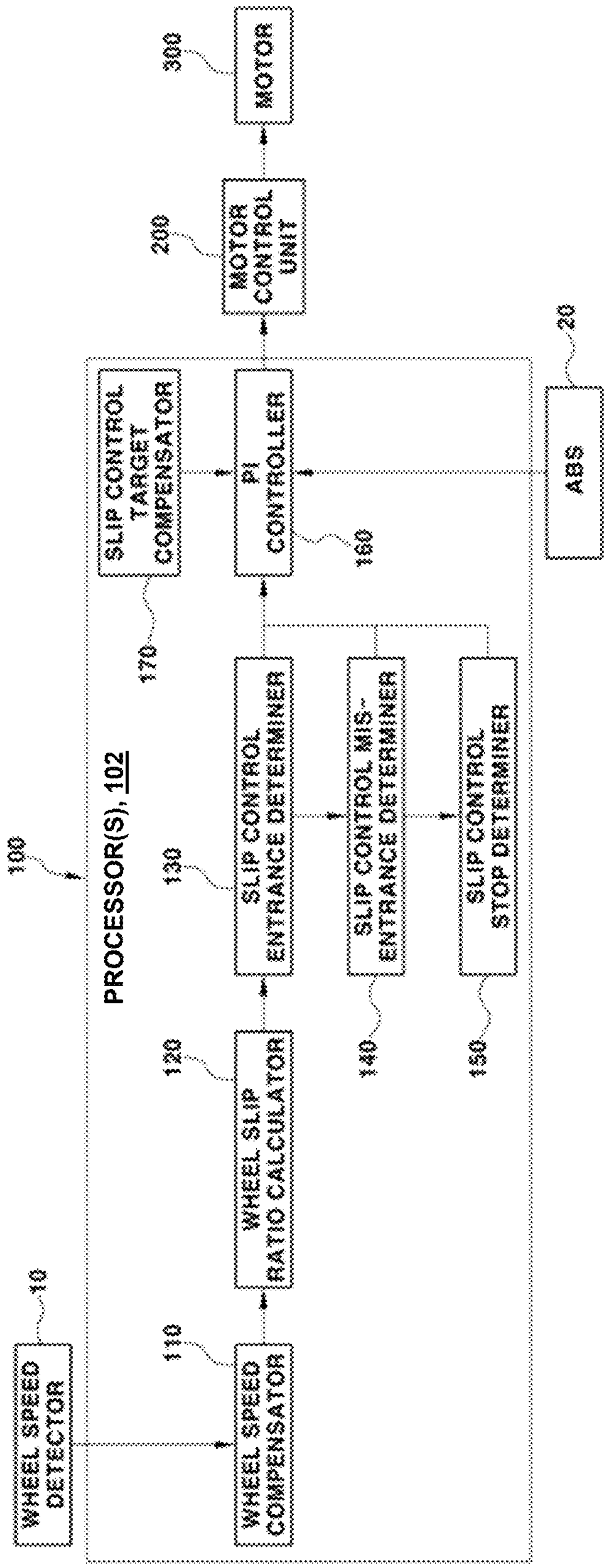
FIG. 2 is a block diagram showing the configuration of a system for controlling regenerative braking torque of an eco-friendly vehicle according to the present disclosure.

In the accompanying drawings, FIG. 2 is a block diagram showing the configuration of a system for controlling regenerative braking torque of an eco-friendly vehicle according to the present disclosure, in which reference numeral '100' indicates a vehicle controller.

The vehicle controller 100, which is the uppermost controller of echo-friendly vehicles, may be configured to determine and give a motor torque instruction value for regenerative braking, etc. to a motor controller 200, and the motor controller 200 controls driving torque of a motor 300 and regenerative braking torque based on the motor torque instruction value.

The vehicle controller 100 includes at least one processor 102 that may comprise a wheel speed compensator 110, a wheel slip ratio calculator 120, a slip control entrance determiner 130, a slip control mis-entrance determiner 140, a slip control stop determiner 150, a Proportional-Integral (PI) controller 160, and a slip control target compensator 170.

The wheel slip compensator 110 compensates for a speed difference between front wheels and rear wheels in advance in consideration of that wheel slip of driving wheels is generated when the tires of front wheels that are non-driving wheels and the tires of rear wheels that are driving wheels are different kinds of tires or the air pressure of the tires are not managed well.

That is, the wheel speed compensator 110, as will be described below, is configured to compensate for a wheel speed difference between front wheels and rear wheel in advance in order to secure accuracy of low-friction slip control (LSC: Low μ slip control) in which the PI controller 160 controls motor torque to a level for reducing a wheel slip ratio to a target wheel slip ratio through PI control.

For reference, the low-friction slip control (LSC) may be defined as PI control that controls regenerative braking torque (coast regen torque) to a level at which a wheel slip ratio is decreased to a target slip ratio by means of the PI controller 160 when an eco-friendly vehicle coasts on a low-friction road.

Meanwhile, when the wheel speed of each of left and right front wheels and left and right rear wheels is detected by a wheel speed sensor that is a wheel speed detector, if the tires of front wheels that are non-driving wheels and the tires of rear wheels are the same kind of tires and the air pressures of the tires are all at an appropriate level, the wheel speeds of the wheels may be detected as almost the same levels.

However, when the tires of front wheels that are non-driving wheels and the tires of rear wheels are different kinds of tires and the air pressures of the tires are different, the dynamic radii of the tires are different, so a wheel speed difference may be generated between the front wheels and the rear wheels. Accordingly, in order to secure accuracy of low-friction slip control in which the PI controller 160 controls motor torque to a level for reducing a wheel slip ratio to a target wheel slip ratio through PI control, it may be possible to compensate for a wheel speed difference between the front wheels and the rear wheels in advance.

For example, during coasting that satisfies the condition that motor torque is ±10 [Nm] or less, a vehicle speed is 20 [kph] or more, an Anti-lock Brake System (ABS) is off, a steering angle of a steering wheel is 2 [rad] or less, etc., wheel speeds can be compensated for by the wheel speed compensator 110 when the wheel speed difference between front wheels and rear wheels is maintained at ±0.5 [kph] ~±3.5 [kph] for over 200 ms.

To this end, when the speed difference between front wheels and rear wheels is maintained at a predetermined level or more for a predetermined time when an eco-friendly vehicle is coasting, the wheel speed compensator 110, based on detection signals of the wheel speed detectors 10, may be configured to calculate a ratio (FRT Wheel Speed/RR Wheel Speed) between the wheel speed of the front wheels (FRT Wheel Speed) and the wheel speed of the rear wheels (RR Wheel Speed) and may be configured to multiply the calculated ratio by the wheel speed of the rear wheels (RR Wheel Speed), thereby performing wheel speed compensation that generates a speed of the rear wheels that is the same as the wheel speed of the front wheels.

The wheel slip ratio calculator 120 is configured to calculate left and right wheel slip ratio using the following Equations 1 and 2 based on the wheel speed of front wheels that are non-driving wheels and the wheel speed of rear wheels that are driving wheels.

left wheel slip ratio (SlipRatio_LH)=front left wheel speed (FrontLeftWhlSpd)−rear left wheel speed (RearLeftWhlSpd)/front left wheel speed (FrontLeftWhlSpd) [Equation 1]

right wheel slip ratio (SlipRatio_RH)=front right wheel speed (FrontRightWhlSpd)−rear right wheel speed (RearRightWhlSpd)/front right wheel speed (FrontRightWhlSpd) [Equation 2]

In this case, when determining whether to enter low-friction slip control, the slip control entrance determiner 130 selects a large value of the left wheel slip ratio (SlipRatio_LH) and the right wheel slip ratio (SlipRatio_RH) calculated by the wheel slip ratio calculator 120 in order to definitely determine whether to enter low-friction slip control.

If the wheel speeds of the front left and right wheels that are non-driving wheels are a minimum speed (e.g., less than 9 [kph]) when the wheel slip ratios are calculated, slip control may be turned off, so the minimum speed limit of the wheel speeds of the front left and right wheels is set as 9 [kph] or more to prevent mis-calculation when a wheel slip ratio is calculated.

The slip control entrance determiner 130 is configured to determine whether to enter low-friction slip control based on wheel slip ratios calculated by the wheel slip ratio calculator.

That is, the slip control entrance determiner 130 is configured to determine whether to perform wheel slip reduction control through PI control of regenerative braking torque through the PI controller 160 based on the wheel slip ratios calculated by the wheel slip ratio calculator.

For example, when a larger value of the left wheel slip ratio (SlipRatio_LH) and the right wheel slip ratio (SlipRatio_RH) calculated by the wheel slip ratio calculator 120 for a predetermined time (e.g., 100 ms) is in a reference range, the current shift gear is D, the vehicle speed is 9 kpa or more, and wheel speed sensors that are wheel speed detectors does not break, the slip control entrance determiner 130 may be configured to determine to enter low-friction slip control, whereby low-friction slip control in which the PI controller 160 controls motor regenerative braking torque to a level for reducing a wheel slip ratio to a target wheel slip ratio through PI control can be performed.

The slip control mis-entrance determiner 140 is configured to prevent entering low-friction slip control by the PI controller 160 when a difference between the wheel speed of front wheels and the wheel speed of rear wheels decreases, depending on the shapes of driving roads of a vehicle.

That is, the slip control mis-entrance determiner 140 is configured to prevent entering PI control of motor regenerative braking torque for reducing a wheel slip by the PI controller 160 when a difference between the wheel speed of front wheels and the wheel speed of rear wheels decreases, depending on the shapes of driving roads of a vehicle.

For example, the slip control mis-entrance determiner 140 may be configured to determine a driving state in which a vehicle is being driven over a raised spot or a bump and to prevent entering low-friction slip control when a larger value of the difference between a front left wheel speed (FrontLeftWhlSpd) and a rear left wheel speed (RearLeftWhlSpd) and the difference between a front right wheel speed (FrontRightWhlSpd) and a rear right wheel speed (RearRightWhlSpd), which are used when the wheel slip ratio calculator 120 may be configured to calculate wheel slip ratios, decreases by a predetermined level (e.g., 1 kph) for a predetermined time (e.g., 70~100 ms).

The slip control stop determiner 150 is configured to stop low-friction slip control by the PI controller when the coasting condition is removed or regenerative braking torque determined for wheel slip reduction by PI control of the PI controller 160 is maintained at a reference value (preset coasting torque) or less for a predetermined time.

For example, the slip control stop determiner 150 is configured to stop low-friction slip control when a depressed amount of an accelerator pedal is a reference value (e.g., 5%) or more, a vehicle speed is less than a reference speed (e.g., 9 kph) for coasting, a brake pedal switch is turned on, or a breakage signal of a wheel speed sensor is received as the result of receiving a detection signal of an Accelerator pedal Position Sensor (APS) that is an accelerator pedal depression amount detector. Further, the slip control stop determiner 150 is configured to stop low-friction slip control when regenerative braking torque determined for wheel slip reduction by PI control of the PI controller 160 is maintained at a reference value (preset coasting torque) or less for a predetermined time.

The PI controller 160 is configured to perform low-friction slip control (LSC) simultaneously with turning-on of the ABS 20 when a larger wheel slip ratio of the left wheel slip ratio (SlipRatio_LH) and the right wheel slip ratio (SlipRatio_RH) calculated by the wheel slip ratio calculator 120 is a reference level or more.

In more detail, the PI control unit 160 is configured to determine regenerative braking torque of a motor into zero (0) when a large wheel slip ratio over a reference value is generated and the ABS 20 is turned on when an eco-friendly vehicle is coasting, and to perform low-friction slip control (LSC) of determining target regenerative braking torque of a motor as a level for reducing the current wheel slip ratio to a first target wheel slip ratio (e.g., 0.02) when the current wheel slip ratio drops less than reference value and the ABS 20 is turned off.

Figure 6:
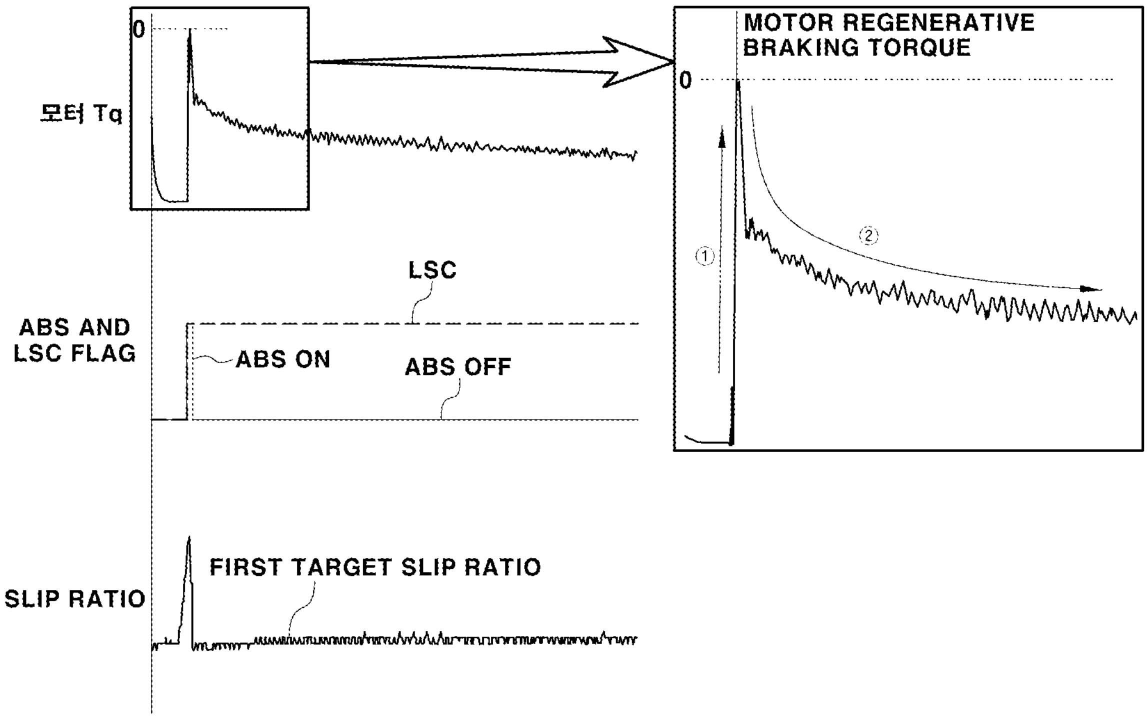
FIG. 6 is a graph showing an example of controlling regenerative braking torque and a wheel slip ratio when an eco-friendly vehicle coasts according to the present disclosure.

To this end, the PI controller 160 may be configured to determine regenerative braking torque of a motor into zero (0), as indicated by an arrow ① in FIG. 6, when a flag of the ABS 20 is on, and controls PI control of gradually increasing regenerative braking torque of a motor up to target regenerative braking torque with a predetermined inclination for a predetermined time such that a wheel slip ratio is reduced and maintained at the first target wheel slip ratio (e.g., 0.02), as indicated by an arrow ② in FIG. 6, when the flag of the ABS 20 is off.

For example, the PI controller 160 may be configured to make a decision such that regenerative braking torque of a motor is controlled in the sequence of −300→−150→0 when the flag of the ABS 20 is on, and may be configured to make a decision such that regenerative braking torque of a motor is controlled in the sequence of −90→−100→−90→−100 from 0 when the flag of the ABS 20 is turned off.

For reference, the fact that the PI controller 160 makes a decision such that regenerative braking torque of a motor is controlled in the sequence of −300→−150→0 means that regenerative braking torque is controlled to immediately follow zero (0) from −300 when the flag of the ABS is turned on, but, actually, the regenerative braking torque cannot immediately become zero (0) due to a torque response and gradually decreases in the sequence of −300→−150→0 as quick as possible.

Of course, regenerative braking torque determined by the PI controller 160 is given to the motor controller 200 and the motor controller 200 controls the motor 300 at the given regenerative braking torque.

That is, the motor controller 200 controls the motor torque based on a regenerative braking torque instruction determined for low-friction slip control of the PI controller 160.

Accordingly, when a wheel slip over a reference value is generated and the ABS is turned on while an eco-friendly vehicle coasts, it is possible to control regenerative brake into zero, and when the ABS is turned off, it is possible to gradually increase regenerative braking torque of a motor up to target regenerative braking torque with a predetermined inclination using PI control. Therefore, it is possible to quickly reduce and maintain a wheel slip amount less than a reference value during coasting, whereby it is possible to achieve coasting stability and stable regenerative braking.

Meanwhile, the PI controller 160 may be configured to reset an integral gain into an actual regenerative braking torque value at the moment when the ABS is turned off from a turned-on state.

In more detail, when the ABS 20 is quickly turned off after turned on, a large difference may be generated between an actual regenerative braking torque following zero (0) with the ABS turned on and a target regenerative braking torque value for determining a level at which the current wheel slip ratio is reduced to the first wheel slip ratio by PI control with the ABS turned off. Accordingly, in order to prevent this problem and maintain continuity of control, the PI controller 160 may be configured to reset an integral gain into an actual regenerative braking torque value at the moment when the ABS is turned off from a turned-on state.

When the integral gain is reset into an actual regenerative braking torque value, the PI controller may be configured to calculate again target regenerative braking torque based on the actual torque at the moment when the ABS is turned off, so control can be continuously performed.

For example, when regenerative braking torque with the ABS turned on is zero (0) and the ABS is turned off, the PI controller may be configured to calculate again target regenerative braking torque from 0 by resetting the integral gain into zero (0), and when the actual regenerative braking torque is −100 at the moment when the ABS is turned off, the PI controller may be configured to reset the integral gain into −100 and may be configured to calculate again target regenerative braking torque, whereby it is possible to secure continuity of low-friction slip control and improve a control speed.

Meanwhile, while low-friction slip control is performed by the PI controller 160, a wheel slip ratio over a reference value is frequently generated due to a reason that different kinds of tires are mounted on front wheels and rear wheels, etc., so the ABS 20 may be continuously turned on/off over the time within a predetermined time (e.g., 2 seconds).

That is, a wheel slip is reduced to the first target wheel slip ratio (e.g., 0.02) and the ABS is not turned on due to low-friction slip control by the PI controller 160, but when a wheel slip ratio over a reference value is generated due to a reason that different kinds of tires are mounted on front wheels and rear wheels, etc., the flag of the ABS is easily turned on, which may interfere with low-friction slip control of the PI controller 160.

Accordingly, the slip control target compensator 170 is configured to temporarily set a target wheel slip ratio into a second target wheel slip ratio (e.g., 0.01) lower than the first target wheel slip ratio (e.g., 0.02) in order to induce reduction of regenerative braking torque when the ABS 20 is continuously turned on/off over three times within a predetermined time (e.g., 2 seconds).

That is, the slip control target compensator 170 gives an instruction to the PI controller 160 to temporarily set a target wheel slip ratio into a second target wheel slip ratio (e.g., 0.01) lower than the first target wheel slip ratio (e.g., 0.02) in order to induce reduction of regenerative braking torque when the flat of the ABS is easily turned on, for example, the ABS 20 is continuously turned on/off over three times within a predetermined time (e.g., 2 seconds).

Accordingly, the PI controller 160 may be configured to perform PI control of gradually increasing regenerative braking torque of a motor with a predetermined inclination for a predetermined time such that a wheel slip ratio is reduced and maintained at the second target wheel slip ratio (e.g., 0.01), thereby being able to further decrease the regenerative braking torque. Accordingly, it is possible to prevent the flag of the ABS from being easily turned on and interfering low-friction slip control of the PI controller 160 and it is possible to secure continuity of the low-friction slip control of the PI controller 160.

A method of controlling regenerative braking torque of the present disclosure that is performed based on the system configuration described above is sequentially described hereafter.

Figure 3:
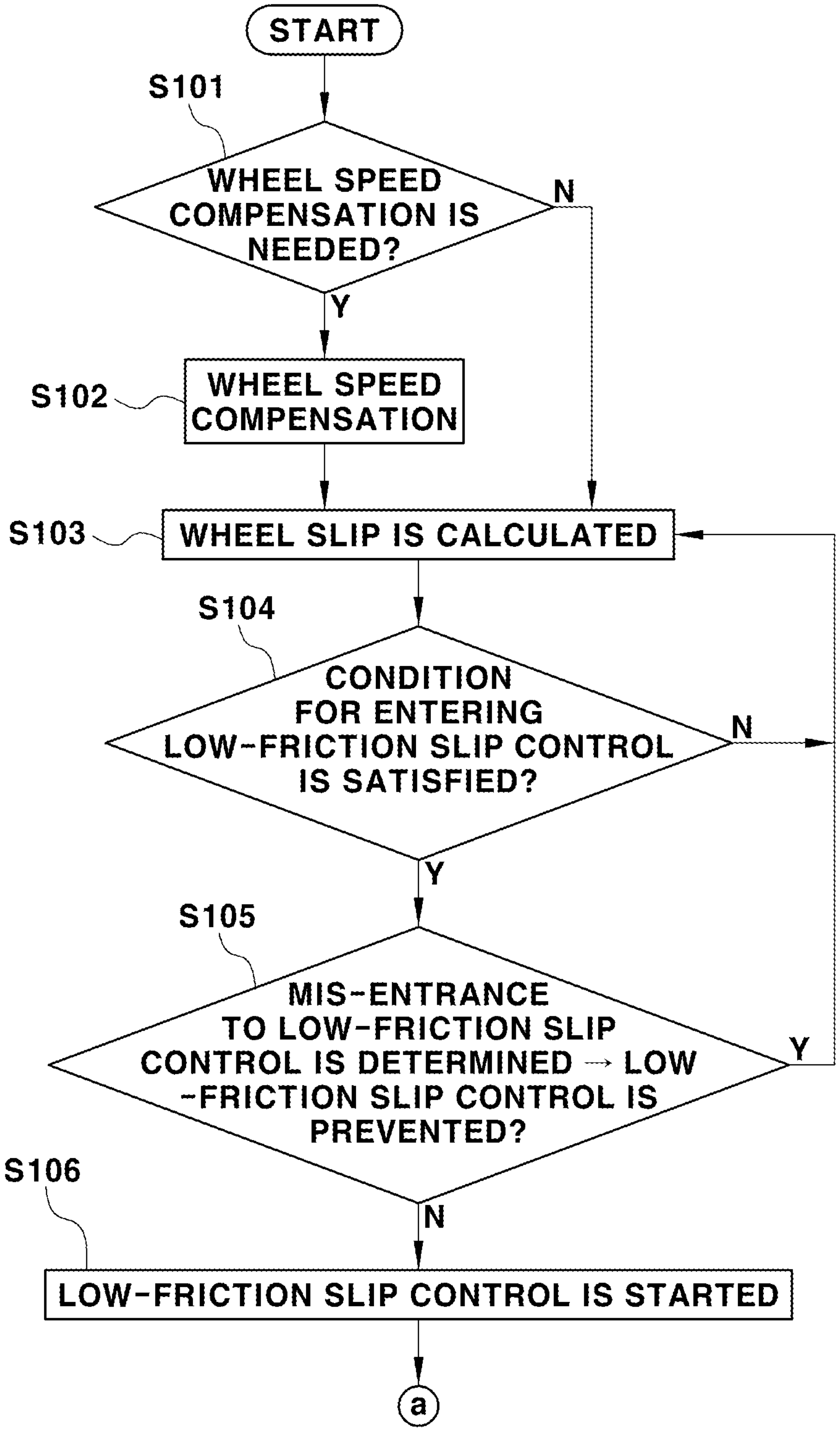
FIGS. 3, 4, and 5 are flowcharts sequentially showing a method of controlling regenerative braking torque of an eco-friendly vehicle according to the present disclosure.
Figure 4:
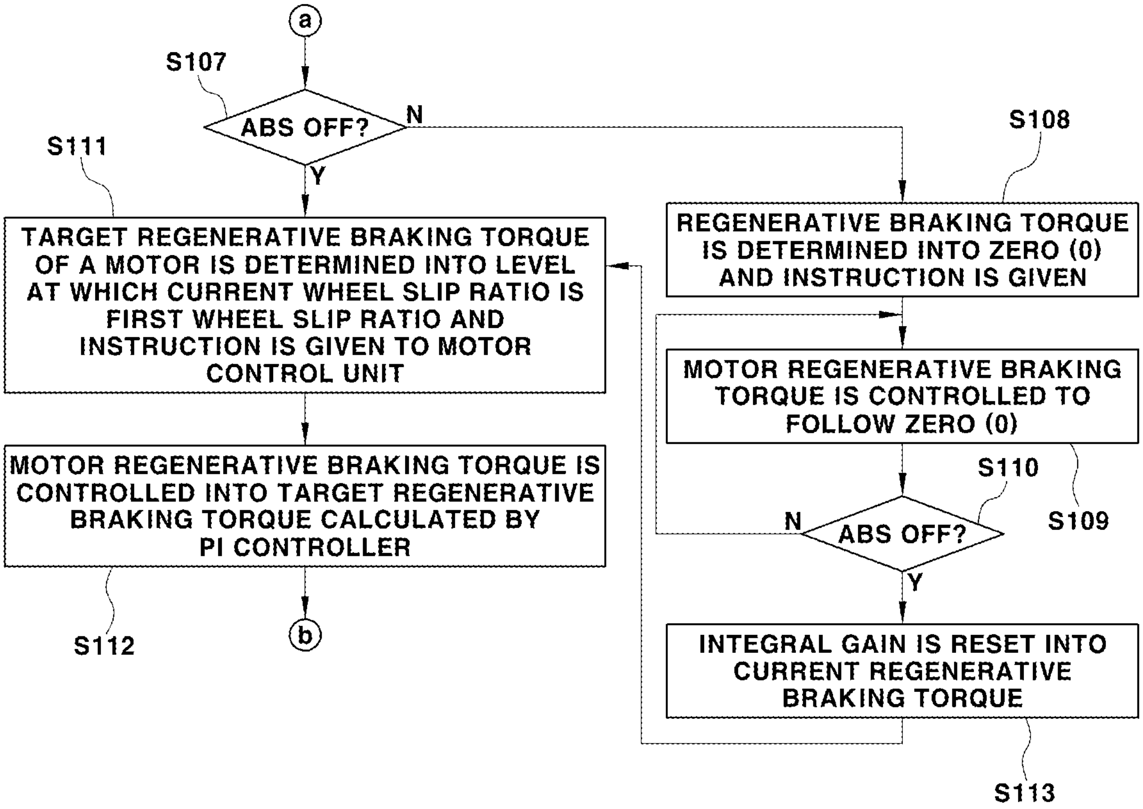
Figure 5:
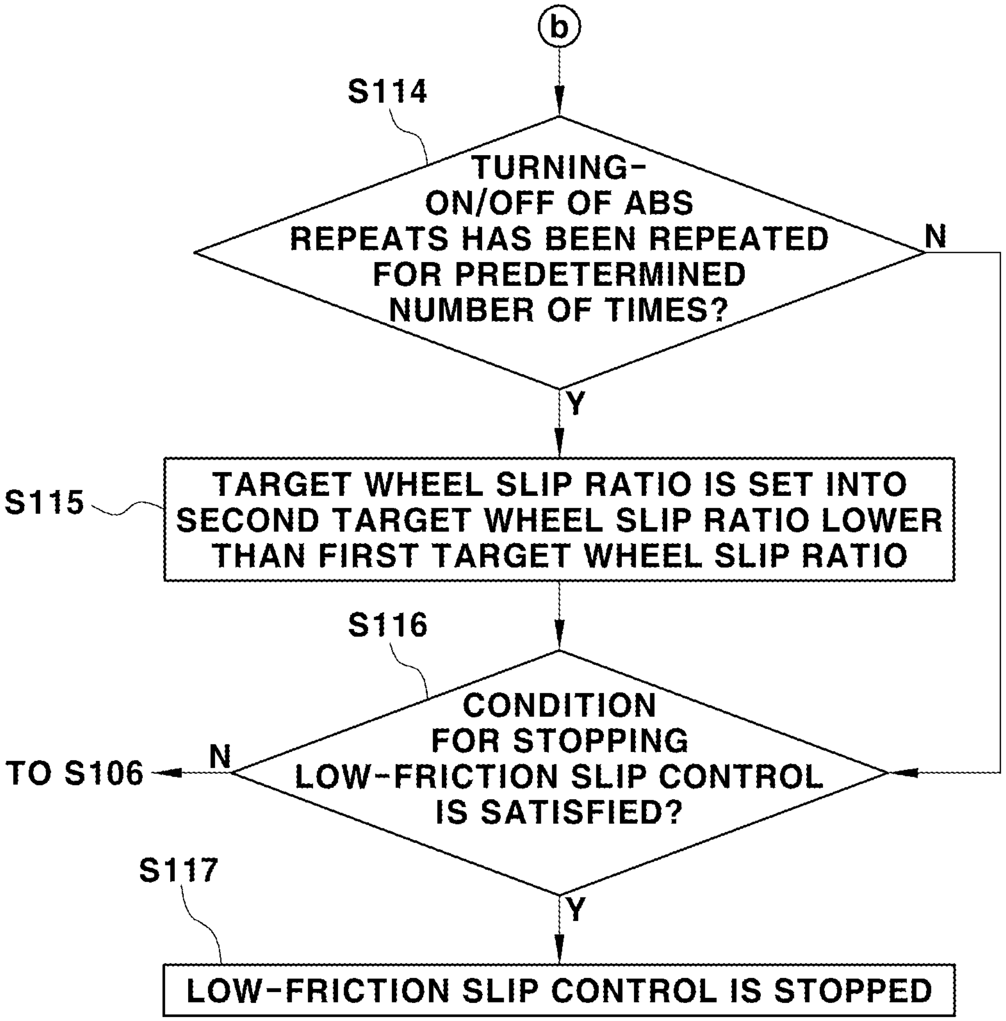

In the accompanying drawings, FIGS. 3, 4, and 5 are flowcharts showing a method of controlling regenerative braking torque of an eco-friendly vehicle according to the present disclosure.

First, the wheel speed compensator 110 of the vehicle controller 100 may be configured to determine whether there is a need for wheel speed compensation for compensating for a speed difference between front wheels and rear wheel (S101).

When the wheel speed of each of left and right front wheels and left and right rear wheels is detected by a wheel speed sensor that is a wheel speed detector, if the tires of front wheels that are non-driving wheels and the tires of rear wheels are the same kind of tires and the air pressures of the tires are all at an appropriate level, the wheel speeds of the wheels may be detected as almost the same levels, so there is no need for wheel speed compensation.

On the other hand, when the tires of front wheels that are non-driving wheels and the tires of rear wheels that are driving wheels are different kinds of tires and there is an air pressure difference between the tires, wheel slip control cannot be normally performed when there is a difference in wheel speed signals of the wheels detected by wheel speed sensors that are wheel speed detectors due to the dynamic radii of the tires rather than wheel slip, so wheel speed compensation is needed.

Accordingly, when wheel speed compensation is needed, a wheel speed difference between front wheels and rear wheel is compensated for in order to secure accuracy of low-friction slip control (LSC: Low μ slip control) in which the PI controller 160 controls motor regenerative braking torque to a level for reducing a wheel slip ratio to a target wheel slip ratio through PI control.

For example, during coasting that satisfies the condition that motor torque is ±10 [Nm] or less, a vehicle speed is 20 [Kph] or more, an ABS is off, a steering angle of a steering wheel is 2 [rad] or less, etc., wheel speeds can be compensated for by the wheel speed compensator 110 when the wheel speed difference between front wheels and rear wheels is maintained at ±0.5 [kph]~±3.5 [kph] for over 200 ms.

To this end, when the speed difference between front wheels and rear wheels is maintained at a predetermined level or more for a predetermined time when an eco-friendly vehicle is coasting, the wheel speed compensator 110, based on detection signals of the wheel speed detectors 10, may be configured to calculate a ratio (FRT Wheel Speed/RR Wheel Speed) between the wheel speed of the front wheels (FRT Wheel Speed) and the wheel speed of the rear wheels (RR Wheel Speed) and multiplies the calculated ratio by the wheel speed of the rear wheels (RR Wheel Speed), thereby performing wheel speed compensation that generates a speed of the rear wheels that is the same as the wheel speed of the front wheels (S102).

Next, the wheel speed compensator 110 of the vehicle controller 100 may be configured to calculate wheel slip ratios (S103).

The wheel slip ratio calculator 120 may be configured to calculate left and right wheel slip ratio using the above Equations 1 and 2 based on the wheel speed of front wheels that are non-driving wheels and the wheel speed of rear wheels that are driving wheels.

In this case, the wheel speed of the rear wheels that are driving wheel may be the original wheel speed when there is no need for wheel speed compensation and may be a wheel speed compensated for in step S102 described above.

Next, the slip control entrance determiner 130 of the vehicle controller 100 may be configured to determine to enter low-friction slip control based on the wheel slip ratios calculated by the wheel slip ratio calculator 120 (S104).

That is, the slip control entrance determiner 130 is configured to determine whether to perform wheel slip reduction control through PI control of regenerative braking torque through the PI controller 160 based on the wheel slip ratios calculated by the wheel slip ratio calculator.

When determining whether to enter low-friction slip control, the slip control entrance determiner 130 selects a large value of the left wheel slip ratio (SlipRatio_LH) and the right wheel slip ratio (SlipRatio_RH) calculated by the wheel slip ratio calculator 120 in order to definitely determine whether to enter low-friction slip control.

For example, when a larger value of the left wheel slip ratio (SlipRatio_LH) and the right wheel slip ratio (SlipRatio_RH) calculated by the wheel slip ratio calculator 120 for a predetermined time (e.g., 100 ms) is in a reference range, the current shift gear is D, the vehicle speed is 9 kpa or more, and wheel speed sensors that are wheel speed detectors does not break, the slip control entrance determiner 130 may be configured to determine to enter low-friction slip control in which the PI controller 160 controls motor regenerative braking torque to a level at which a wheel slip ratio is reduced to a target wheel slip ratio through PI control.

Next, the slip control mis-entrance determiner 140 of the vehicle controller 100 may be configured to determine whether low-friction slip control has been entered wrong (S105).

The slip control mis-entrance determiner 140 may be configured to determine mis-entrance to low-friction slip control and prevents entering PI control of motor regenerative braking torque for reducing a wheel slip by the PI controller 160 when a difference between the wheel speed of front wheels and the wheel speed of rear wheels decreases, depending on the shapes of driving roads of a vehicle.

For example, the slip control mis-entrance determiner 140 may be configured to determine a driving state in which a vehicle is being driven over a raised spot or a bump, and prevents entering low-friction slip control when a larger value of the difference between a front left wheel speed (FrontLeftWhlSpd) and a rear left wheel speed (RearLeftWhlSpd) and the difference between a front right wheel speed (FrontRightWhlSpd) and a rear right wheel speed (RearRightWhlSpd), which are used when the wheel slip ratio calculator 120 may be configured to calculate wheel slip ratios decreases by a predetermined level (e.g., 1 kph) for a predetermined time (e.g., 70~100 ms).

However, when it is not mis-entrance to low-friction slip control as the result of determining whether it is mis-entrance to low-friction slip control by the slip control mis-entrance determiner 140, low-friction slip control can be performed by the PI controller 160.

Next, the PI controller 160 of the vehicle controller 100 may be configured to start low-friction slip control (LSC) (S106).

That is, the PI controller 160 may be configured to start low-friction slip control (LSC) when a larger wheel slip ratio of the left wheel slip ratio (SlipRatio_LH) and the right wheel slip ratio (SlipRatio_RH) calculated by the wheel slip ratio calculator 120 is a reference level or more.

In this case, the PI controller 160 can check whether the ABS 20 has been turned on/off.

As the result of checking, when the flag of the ABS 20 has been turned on, the PI controller may be configured to determine regenerative braking torque into zero (0) and gives an instruction to the motor controller 200 (S108).

In this case, when the flag of the ABS 20 has been turned on, as shown in FIG. 6, the PI controller 160 may be configured to determine regenerative braking torque of a motor into zero (0), as indicated by the arrow ① in FIG. 6.

For example, when the flag of the ABS 20 has been turned on, the PI controller 160 makes a decision such that the regenerative braking torque of a motor is controlled in the sequence of −300→−150→0.

As described above, the fact that the PI controller 160 makes a decision such that regenerative braking torque of a motor is controlled in the sequence of −300→−150→0 means that regenerative braking torque is controlled to immediately follow zero (0) from −300 when the flag of the ABS is turned on, but, actually, the regenerative braking torque cannot immediately become zero (0) due to a torque response and gradually decreases in the sequence of −300→−150→0 as quick as possible.

Accordingly, the regenerative braking torque of a motor is controlled into zero by the motor controller 200 (S109), and thus, the wheel slip ratio drop less than a reference value.

On the other hand, when the PI controller 160 recognizes that the wheel slip drops less than the reference value and the flag of the ABS is turned off, the PI controller 160 may be configured to determine target regenerative braking torque of a motor into a level at which the current wheel slip ratio is the first wheel slip ratio (e.g., 0.02), and gives an instruction to the motor controller 200 (S111).

In this case, when the flag of the ABS 20 has been turned off, the PI controller 160 may be configured to perform PI control of gradually increasing regenerative braking torque of a motor to target regenerative braking torque with a predetermined inclination for a predetermined time such that a wheel slip is reduced and maintained at the first wheel slip ratio (e.g., 0.02), as indicated by the arrow ② in FIG. 6.

For example, when the flag of the ABS 20 has been turned on, the PI controller 160 can make a decision such that the regenerative braking torque of a motor is controlled in the sequence of −90→−100→−90→−100 from 0.

Accordingly, the motor controller 200 controls the regenerative braking torque of a motor into the target regenerative braking torque calculated by the PI controller 160 (S112).

That is, the regenerative braking torque of a motor can be controlled to be gradually increased from zero to target regenerative braking torque with a predetermined inclination for a predetermined time such that a wheel slip is reduced and maintained at the first wheel slip ratio (e.g., 0.02).

As described above, when a wheel slip over a reference value is generated and the ABS is turned on while an eco-friendly vehicle coasts, it is possible to control regenerative brake into zero, and when the ABS is turned off, it is possible to gradually increase regenerative braking torque of a motor with a predetermined inclination from zero using PI control. Therefore, it is possible to quickly reduce and maintain a wheel slip amount less than a reference value during coasting, whereby it is possible to achieve coasting stability and stable regenerative braking.

Meanwhile, when it is recognized that the ABS 20 is turned off after turned on by checking whether the ABS 20 is turned off after turned on (S110), and a large difference may be generated between an actual regenerative braking torque following zero (0) with the ABS turned on and a target regenerative braking torque value for determining a level at which the current wheel slip ratio is reduced to the first wheel slip ratio by PI control with the ABS turned off. Accordingly, in order to prevent this problem and maintain continuity of control, the PI controller may be configured to reset an integral gain into an actual regenerative braking torque value at the moment when the ABS is turned off from a turned-on state (S113).

When the integral gain is reset into an actual regenerative braking torque value, the PI controller may be configured to calculate and determine again target regenerative braking torque based on the actual torque at the moment when the ABS is turned off, as in step S111, so control can be continued.

For example, when regenerative braking torque with the ABS turned on is zero (0) and the ABS is turned off, the PI controller 160 may be configured to calculate again target regenerative braking torque from 0 by resetting the integral gain into zero (0), and when the actual regenerative braking torque is −100 at the moment when the ABS is turned off, the PI controller may be configured to reset the integral gain into −100 and may be configured to calculate again target regenerative braking torque, whereby continuity of low-friction slip control can be secured.

Accordingly, the PI controller 160 may be configured to determine target regenerative braking torque value so that a target slip ratio can be achieved by adding a P gain by an absolute value difference or a current slip ratio and a target slip ratio and an I gain by an integration value, and controls the actual regenerative braking torque of a motor into the determined target regenerative braking torque, whereby it is possible to quickly reduce a wheel slip amount less than a reference value during coasting. Therefore, not only it is possible to achieve coasting stability and stable regenerative braking, but continuity of low-friction slip control can be secured.

Meanwhile, while low-friction slip control is performed by the PI controller 160, a wheel slip ratio over a reference value is frequently generated due to a reason that the tires of front wheels and rear wheels are different kinds of tires, etc., so the ABS 20 may be continuously turned on/off over predetermined number of times (e.g., three times) within a predetermined time (e.g., 2 seconds).

That is, a wheel slip is reduced to the first target wheel slip ratio (e.g., 0.02) and the ABS is not turned on due to low-friction slip control by the PI controller 160, but when a wheel slip ratio over a reference value is generated due to a reason that different kinds of tires are mounted on front wheels and rear wheels, etc., the flag of the ABS is easily turned on, which may interfere with low-friction slip control of the PI controller 160.

Accordingly, the slip control target compensator 170 of the vehicle controller 100 checks whether the ABS is continuously turned on/off over predetermined number of times (e.g., three times) within a predetermined time (e.g., 2 seconds) (S114).

As the result of determination, when it is determined that the ABS has been continuously turned on/off over predetermined number of times (e.g., three times) within a predetermined time (e.g., 2 seconds), the slip control target compensator 170 temporarily sets a target wheel slip ratio into the second target wheel slip ratio (e.g., 0.01) lower than the first target wheel slip ratio (e.g., 0.02) to induce reduction of regenerative braking torque, and gives an instruction to the PI controller 160 (S115).

Accordingly, the PI controller 160 may be configured to perform PI control of gradually increasing regenerative braking torque of a motor with a predetermined inclination for a predetermined time such that a wheel slip ratio is reduced and maintained at the second target wheel slip ratio (e.g., 0.01), thereby being able to further decrease the regenerative braking torque. Accordingly, it is possible to prevent the flag of the ABS from being easily turned on and interfering low-friction slip control of the PI controller 160 and it is possible to secure continuity of the low-friction slip control of the PI controller 160.

Meanwhile, during the low-friction slip control described above, the slip control stop determiner 150 of the vehicle controller 100 may be configured to determine whether a low-friction slip control stop condition is satisfied (S116).

For example, the slip control stop determiner 150 may be configured to stop low-friction slip control when a depressed amount of an accelerator pedal is a reference value (e.g., 5%) or more, a vehicle speed is less than a reference speed (e.g., 9 kph) for coasting, a brake pedal switch is turned on, or a breakage signal of a wheel speed sensor is received as the result of receiving a detection signal of an Accelerator pedal Position Sensor (APS) that is an accelerator pedal depression amount detector; and stops low-friction slip control when regenerative braking torque determined for wheel slip reduction by PI control of the PI controller 160 is maintained at a reference value (preset coasting torque) or less for a predetermined time (S117).

As described above, when a wheel slip over a reference value is generated and the ABS is turned on while an eco-friendly vehicle coasts, it is possible to control regenerative brake into zero, and when the ABS is turned off, it is possible to gradually increase regenerative braking torque of a motor with a predetermined inclination using PI control. Therefore, it is possible to quickly reduce and maintain a wheel slip amount less than a reference value during coasting, whereby it is possible to achieve coasting stability and stable regenerative braking.

Although the present disclosure was described above in detail through one embodiment, the scope of the present disclosure is not limited to the embodiment, and various changes and modifications by those skilled in the art using the spirit of the present disclosure defined in the following claims are also included in the scope of the present disclosure.

What is claimed is:

1. A system for controlling regenerative braking torque of s eco-friendly vehicle, the system comprising:

a vehicle controller including at least one processor that comprises:

a wheel dip ratio calculator configured to calculate left and right wheel dip ratios based on a wheel speed of front wheels and a wheel speed of rear wheels;

a slip control entrance determiner configured to determine whether to enter low-friction slip control based on the left and right wheel slip ratios calculated by the wheel dip ratio calculator;

a wheel speed compensator configured to create a wheel speed of rear wheels that is equal to a wheel speed of front wheel by:

calculating a ratio between a wheel speed of the front wheels and a wheel speed of the rear wheels; and multiplying the calculated ratio by the wheel speed of the rear wheels; and a Proportional-Integral (PI) controller configured to determine target regenerative braking torque of a motor as a level at which a wheel slip ratio is a target wheel slip ratio to perform low-friction slip control during coasting; and a moor controller configured to control regenerative braking torque of the motor based on a target regenerative braking torque instruction value determined for low-friction slip control of the PI controller.

2. The system of claim 1, wherein the slip control entrance determiner is configured to select a larger value of a slip ratio of left wheels and a lip ratio of right wheels for determination when determining whether to enter low-friction lip control.

3. The system of claim 1, wherein the at least one processor further comprises a lip control mis-entrance determiner configured to prevent entering low-friction lip control by the PI controller when a difference between the wheel speed of front wheels and the wheel speed of rear wheels decreases, depending on shapes of driving roads.

4. The system of claim 3, wherein the slip control mis-entrance determiner is configured to prevent entering low-friction slip control when a larger value of a difference between a front left wheel speed and a rear left wheel speed and a difference between a front right wheel speed ad a rear right wheel speed decreases by a predetermined level for a predetermined time.

5. The system of claim 1, wherein the PI controller is configured to:

determine the regenerative braking torque of the motor into, zero (0) when a wheel slip ratio over a reference value is generated and an Anti-lock Brake System (ABS) is turned on; and perform low-friction slip control of determining the target regenerative braking torque of the motor as a level at which a current wheel slip ratio decreases to a first target wheel slip ratio when a wheel slip ratio drops less than the reference value and the ABS is turned off.

6. The system of claim 5, wherein the PI controller is configured to perform PI control of increasing the regenerative braking torque of the motor up to the target regenerative braking torque with a predetermined inclination for a predetermined time when the ABS has been turned off such that a wheel slip ratio is reduced and maintained at the first wheel slip ratio.

7. The system of claim 5, wherein the PI controller is configured to reset an integral gain into an actual regenerative braking torque value at a moment when the ABS is turned off from a turned-on state.

8. The system of claim 1, wherein the at least one processor further comprises a slip control stop determiner configured to stop low-friction slip control by the PI controller when:

a coasting condition is removed; or regenerative braking torque, determined by low-friction slip control of the PI controller, is maintained at less than or equal to a reference value for a predetermined time.

9. The system of claim 1, wherein the at least one processor further comprises a slip control target compensator configured to:

set a target wheel slip ratio into a second target wheel slip ratio lower than a first target wheel slip ratio; and give instruction to the PI controller when an Anti-lock Brake System (ABS) is continuously repeatedly turned on and off over a predetermined number of times within a predetermined time during low-friction dip control by the PI controller.

10. A method of controlling regenerative braking torque of an eco-friendly vehicle, the method comprising:

calculating left and right wheel dip ratios based on a wheel speed of front wheels and a wheel speed of rear wheels;

determining to enter low-friction dip control based on the left and right wheel dip ratios;

determining target regenerative braking torque of a motor as a level at which a wheel dip ratio is a target wheel slip ratio to perform low-friction slip control during coasting; and controlling regenerative braking torque of the motor based on a target regenerative braking torque instruction value determined for the low-friction slip control;

the method further comprising creating a wheel speed of rear wheels that is equal to a wheel speed of front wheels by:

calculating a ratio between a wheel speed of the front wheels and a wheel speed of the rear wheels, and multiplying the ratio by the wheel speed of the rear wheels.

11. The method of claim 10, wherein determining to enter the low-fiction slip control comprises selecting a larger value of a dip ratio of left wheels and a slip ratio of right wheels for determination when determining whether to enter low-friction slip control.

12. The method of claim 10, further comprising preventing entering the low-friction slip control when a difference between the wheel speed of front wheels and the wheel speed of rear wheels decreases, depending on shapes of driving roads.

13. The method of claim 12, wherein the preventing entering the low-friction slip control comprises preventing entering low-friction slip control when a larger value of a difference between a front left wheel speed and a rear left wheel speed and a difference between a front right wheel speed and a rear right wheel speed decreases by a predetermined level for a predetermined time.

14. The method of claim 10, wherein in the low-friction dip control:

the regenerative braking torque of the motor is determined into zero (0) when a wheel slip ratio over a reference value is generated and a Anti-lock Brake System (ABS) is turned on, and the target regenerative braking torque of the motor is determined as a level at which a current wheel slip ratio decreases to a first target wheel slip ratio when a wheel slip ratio drops less the reference value and the ABS is turned off.

15. The method of claim 10, wherein the low-friction slip control, when the ABS has been turned off, Proportional-Integral (PI) control of increasing the regenerative braking torque of the motor up to the target regenerative braking torque with a predetermined inclination for a predetermined time is performed such that a wheel slip ratio is reduced and maintained at the first wheel slip ratio.

16. The method of claim 14, further comprising, in the low-friction dip control, resetting an integral gain into an actual regenerative braking torque value at a moment when the ABS is turned off from a turned-on state.

17. The method of claim 10, further comprising stopping low-friction slip control by a Proportional-Integral (PI) controller when a coasting condition is removed or regenerative braking torque determined by low-friction slip control of the PI controller is maintained at less n or equal to a reference value for a predetermined time.

18. The method of claim 10, further comprising:

setting a target wheel slip ratio into a second target wheel slip ratio lower than a first target wheel slip ratio; and giving an instruction to a Proportional-Integral (PI) controller when an Anti-lock Brake System (ABS) is continuously repeatedly turned on and off over a predetermined number of times within a predetermined time during the low-friction slip control.

* * * * *